Patented Feb. 27, 1940

2,191,675

UNITED STATES PATENT OFFICE 2,191,675

SOLID LUBRICANT COMPOSITION

Eger V. Murphree, Summit, and William J. Sweeney, Elizabeth, N. J., assignors to Standard Oil Development Company, a corporation of Delaware No Drawing. Application July 2, 1938, Serial No. 217,218

6 Claims. (Cl. 87—9)

This invention relates to the preparation of improved, normally solid lubricants, such as greases, consisting primarily of a mixture of suitable oils and normally solid soaps, suitable for lubrication of bearings operated at high temperatures and pressures, and to the improved compositions obtained thereby. This invention relates more particularly to methods for preparing driving journal compounds and similar greases of improved texture, feel, moldability, and plasticity, and of increased stability in use at elevated temperatures, say 250° to 300° F. or higher.

It has long been known to be desirable to prepare such greases in as nearly an anhydrous state as possible since even a small amount of water causes the grease to "fan out" of bearings operated at temperatures above about 212° F., probably due to vaporization resulting in an enormous increase in the volume occupied by the water present. Substantially anhydrous greases may be prepared by carefully heating suitable oils, such as steam refined cylinder oil, and suitable soaps such as sodium soaps of tallow acids, to a temperature of about 400° to 500° F. or somewhat higher. However, the greases thus prepared are objectionably crumbly and have a poor texture and are not readily molded into cakes, the form in which they are applied to journals.

It has been shown in the co-pending application Serial No. 704,748, filed December 30, 1933, now Patent No. 2,144,077, of which this application is a continuation-in-part, that substantially anhydrous greases of improved texture and moldability are obtained by the addition of suitable modifying and plasticizing agents, such as small amounts of glycerine and of oxygenated pitches derived from vegetable oils and their corresponding acids and esters.

This application is directed particularly to the use of small amounts of the oxygenated pitches in such grease compositions.

With ordinary greases containing about 40 to 50% of a steam refined cylinder oil or equivalent hydrocarbon oil, and about 40 to 50% of the sodium soap of tallow acids, the addition of small amounts of oxygenated pitches improves the appearance and texture of the grease very substantially. The grease is rendered much smoother in structure and is not grainy nor appreciably fibrous. Such greases also remain smooth on working or kneading. The ability of the grease to feed regularly on driving journal bearings, despite use for long periods of time and exposure to excessive temperatures, is also improved.

Such oxygenated pitches may be obtained by polymerization or thickening of vegetable oils and their corresponding fatty acids and esters. Cotton seed oil pitch, the residue on distillation of "black grease" obtained from cottonseed foots, is an example of one type of pitch suitable for this invention. Other examples are soft stearine pitch and the residue obtained in distilling natural and synthetic fatty acids, such as those obtained by limited oxidation of paraffin wax. While the precise composition has not been determined, it is believed that such residues contain highly polymerized acids and lactones together with other oxygen-containing organic compounds.

The pitches preferred for use according to this invention are those semi-solid, sticky, plastic, non-distillable oxygen-containing polymerization and condensation products of vegetable oils, and corresponding fatty acids (natural or synthetic) and esters of such acids, which are soluble or readily miscible in the oily component of the grease at temperatures below about 200° F. It is ordinarily desirable to use from 1 to 10% of such pitches in the grease, although greater or smaller amounts may be used. These pitches may be added to basic neutral or acid greases, and may be present in the grease either in their original form, with their acid components free, or partly or wholly neutralized with alkali or other suitable bases.

It has been found that greases of especially desirable properties for use as locomotive driving journal lubricants are obtained by using as the modifying agent a residue obtained in distilling synthetic fatty acids obtained by limited oxidation of paraffine wax. The structure of the grease is advantageously modified and the resulting grease is not as hard or brittle as are the greases obtained when using pitches obtained from vegetable oils and fatty acids, such as cottonseed oil pitch and stearine pitch. The feeding of the grease on locomotive driving journals is also greatly improved. Locomotive driving journal greases containing vegetable oil or fatty acid pitches, such as cottonseed oil pitch and stearine pitch, have a tendency to develop a carbonized or glazed surface over long periods of use which interfere with the feeding of the grease to the journal. This tendency is very greatly reduced by substituting for such pitches the oxidized wax acid distillation residues described herein. These distillation residues are quite stable under the conditions of use of locomotive driving journal greases and neither vaporize nor carbonize in use. They are also substantially superior for these reasons to the fatty acids, such as stearic and oleic acid.

The synthetic fatty acid distillation residue is a by-product of the oxidation of paraffine wax. It is known that paraffin wax may be oxidized with air in the liquid phase and in the presence of a catalyst such as barium and manganese soaps at temperatures from 100° to 150° C. and at atmospheric or only slightly elevated pressure to yield a large portion of volatile or distillable fatty acids of the molecular weight range used for soap making. Other compounds are produced in addition to the acids, but the material desired for present purposes is a material of unknown constitution, probably polymerized to a considerable degree, which is substantially undistillable even under vacuum.

This material may be obtained in various ways from the crude wax oxidation product, but it is preferred to saponify the fatty materials under pressure with aqueous caustic soda, so as to make a fluid material. Alcohol may be added to prevent emulsification. This product is then extracted with naphtha, kerosene or other solvent in order to remove most of the unconverted wax. The soap solution is then preferably distilled to recover the alcohol and reacidified so that the acids and other organic material collects in a layer above the aqueous solution and this organic layer is decanted and distilled under vacuum, so as to take off substantially all of the material that can be reasonably described as distillable.

The products obtained as a distillate are largely acids of the soap making range, that is, containing from 12 to 18 carbon atoms, but it is the residue which is desired for the present purposes. The chemical constitution of this material is not fully understood, but it has been analyzed to some extent with the following results:

| | Per cent |
|---|---|
| Free acids, about | 30 |
| Esters, lactones, etc. | 65 |
| Unsaponifiable, about | 5 |

The total mixture has a neutralization value of about 46 mg. KOH per gram. The saponification value when the mixture is refluxed with KOH is about 175 mg. KOH per gram, and when carried out under pressure the value is about 250 mg. KOH per gram. It will be seen that this material is very different from an ordinary fat or wax, and it is also free from aldehydes or aldehyde-like compounds.

The free acid content of the material when roughly separated, for example, by solution in alcoholic caustic soda, has the following characteristics:

| | |
|---|---|
| Iodine value | 99 mg. per gram |
| Neutralization value | 85.5 KOH per gram |
| Saponification value (reflux) in KOH | 186.9 mg. per gram |
| Saponification value (pressure) | 220.5 mg. per gram |

The average molecular weight of this acidic material is about 626.5 which is, of course, much higher than most of the known fatty acids highly unsaturated and free of aldehydes. The material remaining after removal of free acid has the following characteristics:

| | |
|---|---|
| Iodine value | 82 mg. per gram |
| Saponification value (pressure) | 115.7 per gram |
| Naphtha soluble | 97.5% |
| Naphtha insoluble | 2.5% |
| Saponifiable | 92.2% |
| Unsaponifiable | 8.6% |

It will be understood that while these analyses are of representative products, the characteristics of the products vary somewhat with changes in the initial waxes and in the conditions of the process. From the above analyses it would appear that the vacuum distillation residue consists of very high molecular weight acids, which are highly unsaturated, together with unsaturated esters and other saponifiable material. The material is polymerized and is of higher molecular weight than the wax from which it was obtained.

These oxidized wax acid distillation residues, which are substantially not distillable without decomposition, may be used directly as obtained in the preparation of the improved greases of this invention. However, such residues may be partially cracked to provide additional synthetic fatty acids, for example, by heating, preferably under vacuum of about 20 mm. mercury absolute pressure, to temperatures of about 325 to 375° C. in order to secure destructive distillation. In this manner, up to about 50% of the charged stock may be recovered as distillate and returned to the saponification treatment described above. The resulting residue from this destructive distillation is of higher molecular weight than the wax acid distillation residues described above and has lower neutralization and saponification values. It is at least equally unsaturated and may be used in place of the wax acid distillation residues in preparing the lubricant compositions of this invention. Examination of an illustrative residue, such as obtained by a destructive vacuum distillation to a 50% bottoms, gave the following analysis:

| | |
|---|---|
| Acid No. | 14 |
| Saponification No. | 146 |
| Unsaponifiable | 28% |

The lubricant compositions prepared with these destructive distillation residues are somewhat harder and are in general not as desirable for use in lubricating locomotive driving journals as are those prepared from the wax acid distillation residues.

The following examples illustrate suitable grease compositions and methods for preparing such greases according to this invention:

EXAMPLE I

| | Per cent |
|---|---|
| Steam refined cylinder stock having a Saybolt viscosity of 210 seconds at 210° F., derived from a Mid-Continent crude | 43 |
| Mid-Continent black oil having a Saybolt viscosity of 150 seconds at 210° F. | 10 |
| Prime tallow | 20 |
| Fatty acids | 13 |
| Wax acid distillation residue | 8 |
| NaOH | 6 |

The fat and the fatty acid are placed in a kettle and melted while adding an equal volume of the mineral oil. 40° Beaumé caustic soda solution is then added with stirring while heating to about 350° F. The wax acid distillation residue is then added. The remaining mineral oil is then added with additional heating up to about 450° F. When the addition of all the oil is completed, the mixture is stirred and heated until it becomes completely liquefied, heating to a maximum of about 500° F. if necessary. The liquefied grease is then drawn off into pans and allowed to cool, whereupon it solidifies. Bars of any desired shape for use in locomotive driving journals are then pressed from this cake.

The grease prepared as above had a very good structure and was not grainy or brittle. It was very smooth and remained smooth on kneading. It was slightly tacky to the touch. Penetrations were determined as follows:

A. S. T. M. penetrations

| | Degrees F. |
|---|---|
| 28 | 77 |
| 116 | 250 |
| 175 | 300 |

EXAMPLE II

Heat 51½ pounds of a steam refined cylinder oil, of 190 to 210 seconds Saybolt viscosity at 210° F., to about 160° F. and add 3 pounds of cottonseed oil pitch (86° F. melting point) with stirring until complete mixing is obtained. Then add 21.9 pounds of free tallow acids and 20 pounds of prime tallow, with stirring. Then add slowly with constant stirring a 40° Beaumé aqueous solution containing 6.65 pounds of caustic soda while maintaining the mixture at a temperature of 160 to 165° F. When the addition of the caustic soda is completed, the mixture is heated slowly to 225° F., at which temperature water begins to steam off and frothing is apt to occur. The rate of heating is thereafter determined by the extent of frothing, which ordinarily lasts about one hour when the grease cooks down at a temperature of about 255° F.

The mixture is then heated rapidly to 500° F. and maintained at this temperature for about 1½ hours or until the moisture content of the grease is less than 1% and is preferably below 0.5 to 0.3%. The cooked grease is then withdrawn from the bottom of the heated vessel into suitable receptacles or molds, in which it is allowed to cool and solidify. The best structure of grease will be obtained by allowing the grease to cool with agitation to just above the temperature at which solidification begins, before the grease is drawn into molds.

The composition of the resulting grease is as follows:

| | By weight |
|---|---|
| Oil | 51.5 |
| Pitch | 3.0 |
| Soap (exclusive of soap from the pitch) | 43.0 |
| Excess NaOH | 0.5 |
| Glycerine | 2.0 |

Greases may also be prepared in the manner described above from the residue obtained in a destructive vacuum distillation to about 50% bottoms of the oxidized wax acid distillation residue. The formulae for such greases are indicated in the following examples.

EXAMPLE III 38 lb. 4 oz. of distilled acids having a titre of 56 (acid No. 166, saponification No. 211) and obtained by oxidation of paraffine wax.

4 lb. 4 oz. of residue of a destructive vacuum distillation of oxidized wax acid distillation residue.

46 lb. 12 oz. of steam refined cylinder stock having a Saybolt viscosity of 160 seconds at 210° F.

10 lb. 10 oz. of 50° Beaumé caustic soda solution.

EXAMPLE IV 21 lb. of a distillate fraction (boiling 240–280° C. at 2 to 3 mm. pressure, distilling with steam; acid No. 152, saponification No. 196) corresponding to stearic acid, of synthetic acids obtained by oxidation of paraffine wax.

2 lb. 5.5 oz. of the residue of destructive distillation of a wax acid distillation residue.

28 lb. 13.25 oz. of steam refined cylinder stock.

5 lb. 13 oz. of 50° Beaumé caustic soda solution.

This invention is not to be limited by any specific examples which have been presented herein solely for the purpose of illustration, but only by the following claims, in which it is desired to claim all novelty insofar as prior art permits.

We claim:

1. A substantially anhydrous grease composition suitable for lubrication of locomotive driving journals, consisting principally of substantially equal amounts of soda soap and heavy hydrocarbon oil and containing a relatively small amount of a residue obtained on the distillation of fatty acids, said residue being miscible with said heavy hydrocarbon oil and substantially non-distillable without decomposition.

2. A substantially anhydrous grease composition suitable for use as a locomotive driving journal lubricant, consisting principally of substantially equal amounts of soda soap and heavy hydrocarbon oil and containing a relatively small amount of a residue obtained by distillation of fatty acids obtained from the oxidation of paraffine wax, said residue being miscible with said heavy hydrocarbon oil and substantially non-distillable without decomposition.

3. Composition according to claim 1 in which the said fatty acids are synthetic acids prepared by low temperature atmospheric pressure catalytic oxidation of paraffine wax.

4. Composition according to claim 1 in which the said distillation residue is a residue of the destructive distillation of fatty acids.

5. Composition according to claim 1 in which said distillation residue is a residue of the destructive distillation of a substantially non-distillable residue resulting from the distillation of a mixture of acids obtained by oxidation of paraffine wax.

6. Composition according to claim 1 in which said fatty acids are synthetic acids prepared by catalytically oxidizing paraffine wax at low temperature and atmospheric pressure, saponifying the fatty acids contained in the product thereby formed with an aqueous solution of alkali, removing unconverted wax by extracting with a solvent, reacidifying the saponified material, and separating the non-aqueous acid layer thus formed.

EGER V. MURPHREE.
WILLIAM J. SWEENEY.